United States Patent [19]
Yoshigai

[11] Patent Number: 4,482,033
[45] Date of Patent: Nov. 13, 1984

[54] CALIPER BRAKE APPARATUS OF THE SIDE-PULL TYPE

[75] Inventor: Toshiharu Yoshigai, Higashi-Osaka, Japan

[73] Assignee: Yoshigai Kikai Kinzoku Kabushiki Kaisha, Osaka, Japan

[21] Appl. No.: 299,206

[22] Filed: Sep. 3, 1981

[51] Int. Cl.³ .......................... B62L 3/00; F16D 65/46
[52] U.S. Cl. ............................... 188/24.19; 188/24.22; 188/196 M
[58] Field of Search ................. 188/2 D, 24.11, 24.12, 188/24.19, 24.21, 24.22, 26, 27, 71.7, 196 M, 196 V, 205 R, 206 R, 24.15; 74/10.85, 89.14, 89.15, 98, 424.8 R, 425

[56] References Cited
U.S. PATENT DOCUMENTS 3,628,635 12/1971 Yoshigai ...................... 188/24.19 X
4,064,972 12/1977 Ohtani et al. ...................... 188/27 X
4,263,990 4/1981 Yoshigai ........................... 188/24.19

FOREIGN PATENT DOCUMENTS 840259 4/1939 France .............................. 188/24.12
56-2434 1/1981 Japan .
2029531 3/1980 United Kingdom ............. 188/24.19

Primary Examiner—Bruce H. Stoner, Jr.
Assistant Examiner—R. R. Diefendorf
Attorney, Agent, or Firm—Koda and Androlia

[57] ABSTRACT

A caliper brake apparatus of the side-pull type having a center adjusting device comprising a fixed member fixedly mounted on a center rod and a turnable member rotatably mounted on the center rod. The turnable member holds a brake spring for the brake apparatus and has a pair of projections extending diametrically outwardly of the rod. The fixed member is provided with an axially movable screw member having a forward end in contact with one of the projections and has a spring member in bearing contact with the other projection for biasing the turnable member to hold the above-mentioned one projection in contact with the forward end of the screw member at all times.

4 Claims, 8 Drawing Figures

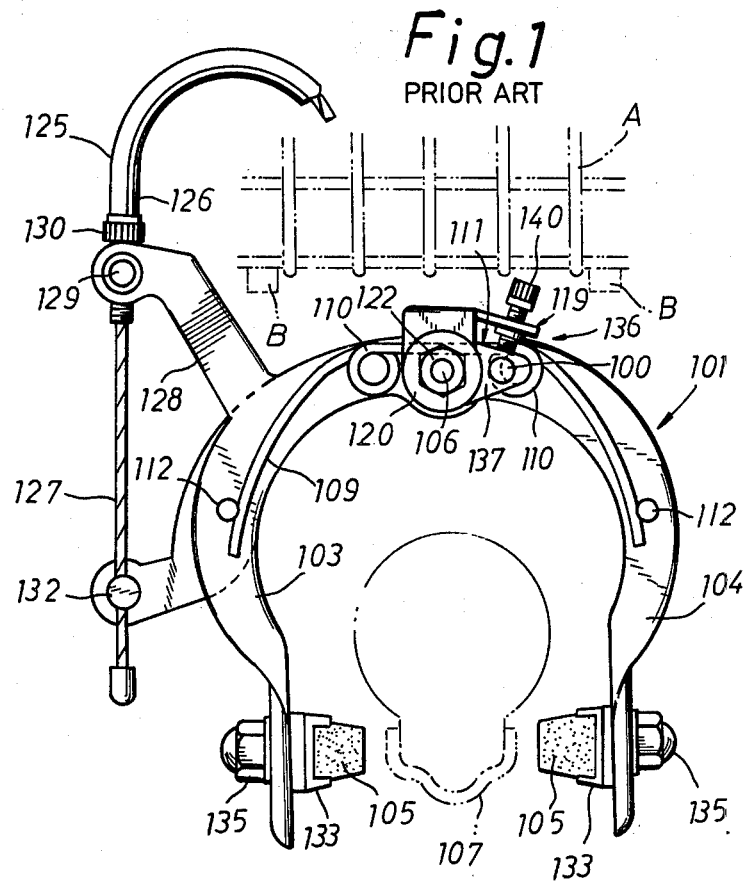
Fig.1 PRIOR ART
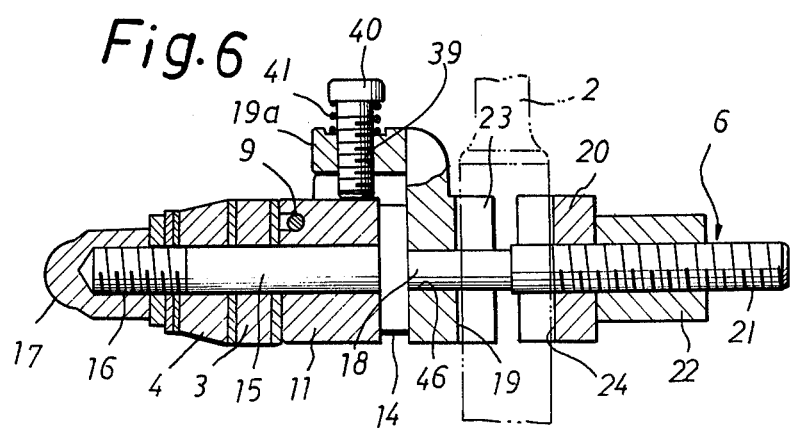

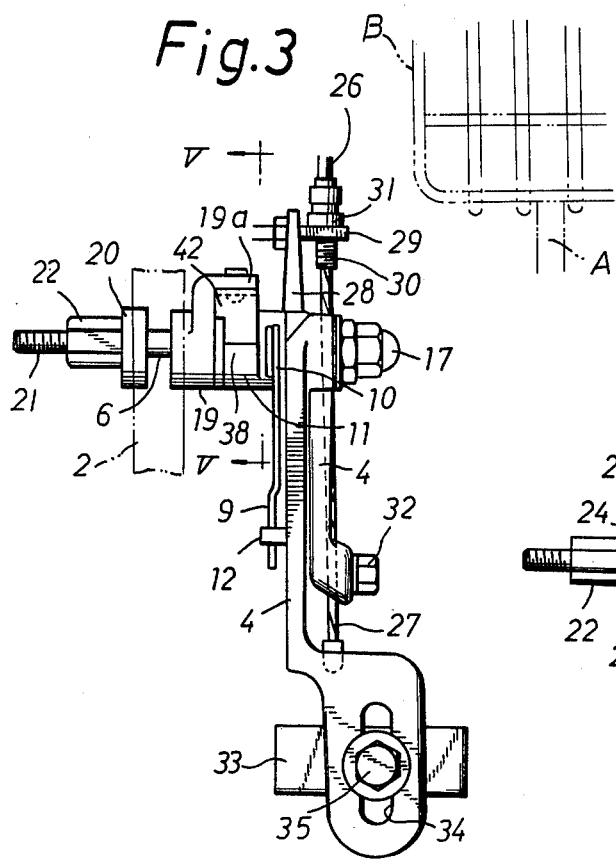
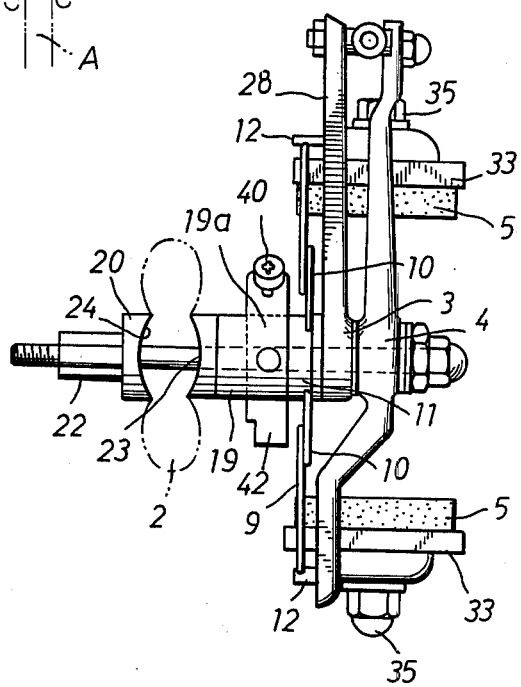
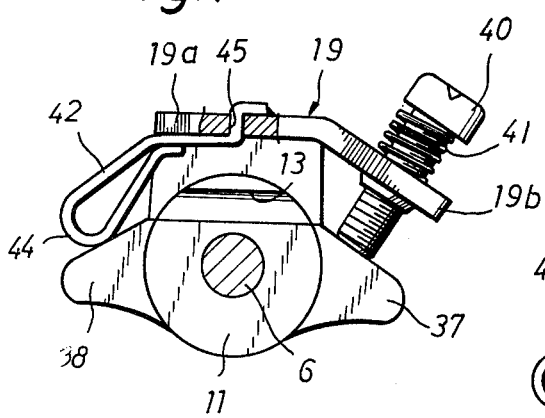
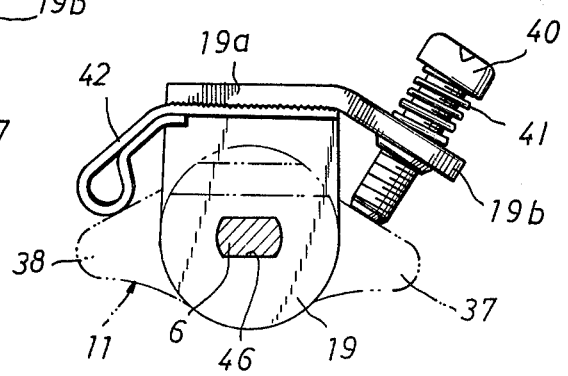

CALIPER BRAKE APPARATUS OF THE SIDE-PULL TYPE

BACKGROUND OF THE INVENTION

The present invention relates to caliper brake apparatus of the side-pull type for bicycles, and more particularly to a center adjusting device for such brake apparatus.

Brake apparatus of this type are widely used in bicycles. With caliper brake apparatus for bicycles, the shoes attached to the distal ends of opposed brake arms wear away during years of use. Such wear takes place not uniformly but invariably unevenly. Especially in the case of the side-pull type, uneven wear occurs very markedly, producing a difference in the shoe-to-rim clearance between the opposite sides of the wheel rim, with the result that the brake fails to operate properly on one side. This is likely to cause a serious accident.

Accordingly when a difference in the shoe-to-rim clearance occurs between the opposite sides of the wheel, there arises the necessity of properly adjusting the clearance, but the adjustment requires a cumbersome procedure, needs skill and is therefore difficult to make accurately.

To overcome the problem, I proposed a brake apparatus equipped with a center adjusting device, which has already been patented as U.S. Pat. No. 4,263,990 (U.S. Patent Application Ser. No. 21,477). The proposed center adjusting device comrises a fixed member fixedly mounted on a center rod for supporting the brake apparatus, and a turnable member turnably mounted on the center rod and holding a brake spring, such that the distance between the fixed member and the turnable member is adjusted by an adjusting screw member to center the brake apparatus. The screw member is screwed in a nut turnably supported on the turnable member. Accordingly the screw member, when advanced or retracted relative to the nut, alters the distance between the fixed member and the turnable member for centering. At this time, the nut turns relative to the turnable member while moving along the screw member. However, the device has the drawback that if the screw member is advanced or retracted on the nut when the nut is unable to turn due to deposition of dust, soil or sand, the screw thread will be collapsed to render the device no longer operable for center adjustment.

SUMMARY OF THE INVENTION

An object of the present invention is to provide a center adjusting device for a caliper brake apparatus of the side-pull type comprising a fixed member fixedly mounted on a center rod for supporting the brake apparatus and a turnable member turnably mounted on the center rod and holding a brake spring for the brake apparatus, the turnable member having a pair of projections extending diametrically outwardly of the rod, the fixed member being provided with a screw member having a forward end in contact with one of the projections of the turnable member for adjusting the turned position of the turnable member, the fixed member further being provided with a spring member in bearing contact with the other projection of the turnable member for biasing the turnable member to hold the above-mentioned one projection in contact with the forward end of the screw member at all times.

Another object of the invention is to provide a center adjusting device of the type described wherein the forward end of the adjusting screw member is merely in contact with one of the projections of the the turnable member, so that when the screw member is advanced from the fixed member to turn the turnable member for adjustment, the screw member and the turnable member are movable independently of each other without the likelihood that the screw thread will be collapsed.

Another object of the invention is to provide a center adjusting device of the type described wherein the spring member on the fixed member is in bearing contact with the other projection of the turnable member for biasing the turnable member to hold the first-mentioned projection in contact with the forward end of the screw member at all times, so that when the screw member is retracted to turn the turnable member for adjustment, the turnable member is properly turnable by the spring member.

Another object of the invention is to provide a center adjusting device of the type described wherein the spring member is made of a steel wire or steel plate and bent into a loop portion the outer periphery of which is in bearing contact with the projection of the turnable member, so that the turnable member is smoothly turnable for center adjustment with the projection thereof in sliding contact with the outer periphery of the loop portion.

Another object of the invention is to provide a center adjusting device of the type described wherein the fixed member has a portion projecting above the turnable member, and the spring member has a tail end fixed to the lower surface of the projecting portion and a forward end extending from the loop portion and joined to the lower side of the tail end, so that even when used for a prolonged period of time, the spring member retains the desired resiliency free of fatigue to assure proper adjustment at all times.

Still another object of the invention is to provide a center adjusting device for a brake apparatus of the type described which is provided with a pair of seat members for clamping the frame of a bicycle from the front and rear to fixedly mount the brake apparatus on the frame, one of the seat members being integral with the fixed member serving as a component of the center adjusting device to provide the brake apparatus without entailing a great increase in the number of all the components thereof and also to render the center adjusting device easy to incorporate into the brake apparatus.

Other objects of the present invention will become apparent from the following description with reference to the accompanying drawings.

BRIEF DESCRIPTION OF THE DRAWINGS

FIG. 1 is a rear view showing a conventional caliper brake apparatus of the side-pull type equipped with a center adjusting device and already proposed by the present inventor;

FIG. 3 is a side elevation showing the brake apparatus;

FIG. 4 is a plan view showing the brake apparatus;

FIG. 6 is an enlarged view in section taken along the line VI—VI in FIG. 2;

FIG. 7 is a fragmentary sectional view corresponding to FIG. 5 and showing another embodiment of the invention; and FIG. 8 is a fragmentary sectional view corresponding to FIG. 7 and showing another embodiment of the invention.

DESCRIPTION OF THE PREFERRED EMBODIMENTS

Figure 2:
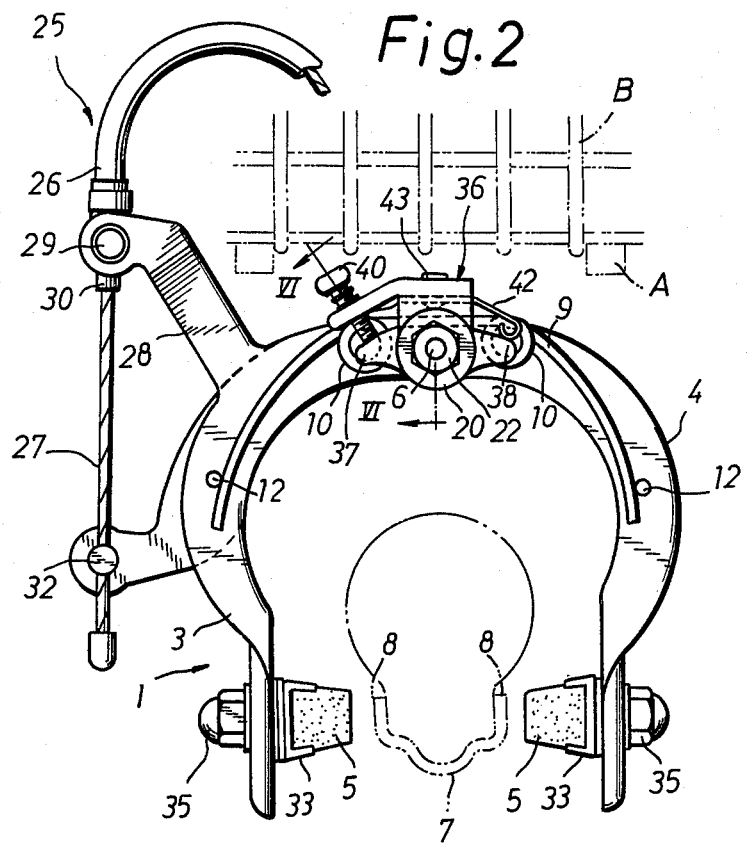
FIG. 2 is a rear view showing a caliper brake apparatus of the side-pull type equipped with a center adjusting device according to the present invention.

Throughout the drawings, like parts are referred to by like reference numerals.

With reference to FIGS. 2 to 6, a caliper brake apparatus 1 is rigidly attached to the front or rear fork 2 of a bicycle by screw fastening means.

The brake apparatus 1 includes a first brake arm 3, called a small arch or Y-arch, and a second brake arm 4, called a large arch or C-arch. A brake shoe 5 is attached to the forward end of each of the brake arms 3, 4.

The other end of the first brake arm 3 and an intermediate portion of the second brake arm 4 are lapped over each other and pivotably supported on a center rod 6, with the brake shoes 5, 5 opposed to the opposite sides of the rim 8 of a wheel 7. The brake arms 3, 4 supported on the center rod 6 are pivotally movable to bring their forward ends toward or away from each other, thereby moving the brake shoes 5, 5 into or out of contact with the rim 8.

A brake spring 9 is in the form of an arch in its entirety, has coiled portions 10, 10 at the opposite shoulders of the arch and is provided along the arms 3, 4 to bias the forward ends thereof away from each other. The brake spring 9 has a top portion retained by a spring holder 11 and opposite ends in engagement with protrusions 12, 12 on the brake arms 3, 4. The spring holder 11 is mounted on the center rod 6 and formed in its front side with a holding groove 13 having the brake spring 9 fitted therein.

As seen in FIG. 6, the center rod 6 is integrally formed with a large-diameter portion 14 at an intermediate part thereof. The spring holder 11, the first brake arm 3 and the second brake arm 4 are mounted on the front-half portion 15 of the rod extending forward from the large-diameter portion 14. A cap nut 17 is screwed on a threaded portion 16 at the forward end of the rod. The rear-half portion 18 of the center rod 6 extending rearward from its portion 14 has a pair of seat members 19, 20 supported thereon and a nut 22 screwed on a threaded portion 21 at the rod rear end. The rear-half rod portion 18 is inserted through the fork 2, a component of the bicycle frame, with the pair of seat members 19, 20 positioned in front and rear of the fork 2, and the nut 22 is tightened up to clamp the fork 2 with the seat members 19, 20 and thereby fix the center rod 6 to the fork 2. As shown in FIG. 4, the seat members 19, 20 are formed with curved recessed faces 23, 24 opposed to each other and fitting to the fork 2.

The first brake arm 3 and the second brake arm 4 are operated by a brake wire 25 called a bowden wire and comprising an outer wire 26 and an inner wire 27.

A branch arm 28 extends from an intermediate portion of the first brake arm 3 and is provided with a connector 29 at its forward end. A screw-threaded tube 30 inserted through the connector 29 has a threaded adjusting member 31 screwed thereon. The other end of the second brake arm 4 has an inner wire connector 32.

The outer wire 26 of the brake wire 25 is held at its one end by the threaded tube 30. The inner wire 27 extends through the threaded tube 30 and is attached to the inner wire connector 32. The other end of the brake wire 25 is connected to a brake operating lever mounted on the handle of the bicycle.

Each of the brake shoes 5, 5 is in the form of a wear-resisting block which is held by a holder 33. A bolt projecting from the holder 33 is inserted through a guide slot 34 in the brake arm. A nut 35 is screwed on the bolt. When the nut 35 is loosened, the brake shoe 5 is movable radially of the wheel 7 within the range of the guide slot 34 shown in FIG. 3 for the adjustment of its position.

The center adjusting device 36 of this invention comprises a fixed member fixedly mounted on the center rod 6 and a turnable member rotatably mounted on the center rod 6. The seat member 19 positioned on the front side of the fork 2 is utilized as the fixed member. The member 19 will be hereinafter referred to as the fixed member. The spring holder 11 is utilized as the turnable member and will be hereinafter referred to as the turnable member.

Figure 5:
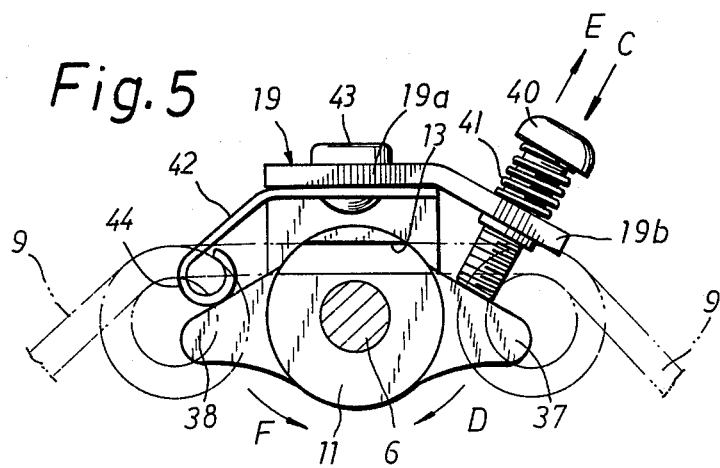
FIG. 5 is an enlarged view in section taken along the line V—V in FIG. 3.

The turnable member 11 is integrally formed with a pair of first projection 37 and second projection 38 extending radially outwardly of the rod 6 as seen in FIG. 5.

The fixed member 19 is integrally formed with a portion 19a projecting horizontally forward and positioned above the turnable member 11 (FIG. 6), and a lateral projecting portion 19b extending from the forward projecting portion 19a to a position above the first projection 37 (FIG. 5). An adjusting screw member 40 is inserted through a threaded bore 39 in screw-thread engagement therewith which bore 39 extends through the lateral projecting portion 19b perpendicular thereto. The forward end of the screw member 40 is in contact with the upper side of the first projection 37. The screw member 40 is provided with a coil spring 41 for preventing loosening.

The forward projecting portion 19a of the fixed member 19 has a spring member 42 in bearing contact with the upper side of the second projection 38 for biasing the turnable member 11 in such a direction that the first projection 37 is held in contact with the forward end of the screw member 40 at all times. The spring member 42 is made of a steel wire or steel plate and has a tail end fixed to the lower side of the forward projecting portion 19a by a rivet 43 and a forward end bent into a loop portion 44. The outer periphery of the loop portion 44 is in bearing contact with the second projection 38.

FIG. 7 shows another embodiment wherein a spring member 42 has a tail end fixed to the lower side of the forwardly projecting portion 19a of the fixed member 19 and is bent into a U-shaped loop portion 44. The forward end of the spring member 42 is joined to the lower side of the tail end. The tail end of the spring member 42 is approximately Z-shaped by bending, inserted through a hole 45 in the forwardly projecting portion 19a and secured thereto by crimping.

FIG. 8 shows another embodiment wherein a spring member 42 has a tail end fixed to the lower side of the forward projecting portion 19a by welding. The fixed member 19 has a noncircular rod bore 46 in which the center rod 6 is fitted, whereby the fixed member 19 and the center rod 6 are completely prevented from rotation relative to each other.

Indicated at B is a basket container, and at A are fastening members for attaching the container B to the bicycle frame.

According to the invention described above, the brake apparatus 1 is centered in the following manner. During repeated use, the brake shoes 5, 5 of the brake apparatus 1 wear unevenly relative to each other, rendering the apparatus 1 operable properly only on one side of the wheel. This can be remedied by centering, i.e. merely by advancing or retracting the screw member 40 in screw-thread engagement with the fixed member 19. Stated more specifically with reference to FIG. 5, the screw member 40, when advanced in a direction C by turning, depresses the first projection 37 with its forward end, rotating the turnable member 11 clockwise D on the center rod 6 against the spring member 42. Conversely if the screw member 40 is retracted in a direction E by loosening, the spring member 42 bearing on the second projection 38 rotates the turnable member 11 counterclockwise F.

Thus the fixed member 19 is fixed to the center rod 6, while the turnable member 11 is rotatable on the rod 6, so that the rotated or turned position of the turnable member 11 is adjustable by altering the distance between the two members 19, 11 by the screw member 40. Because the turnable member 11 has the brake spring 9 held thereto, the member 11 turns about the center rod 6 the overall brake apparatus 1 along with the brake spring 9. Accordingly this adjustment positions the pair of brake shoes 5, 5 on the opposite sides of the rim 8 at the same distance therefrom.

Most preferably the brake apparatus is centered by operating the brake lever on the handle first to bring the apparatus 1 into a braking position through the wire 25, turning the screw member 40 for centering as described above while maintaining this state to position the pair of brake shoes 5, 5 in contact with the opposite sides of the rim 8, and thereafter freeing the brake lever to move the brake arms 3, 4 away from each other, whereby the brake shoes 5, 5 are spaced at equal distances from the opposite sides of the rim 8.

For a better understanding of the advantages of the invention described, the center adjusting device already proposed by the present inventor and disclosed in U.S. Pat. No. 4,263,990 (U.S. patent application Ser. No. 21,477) will be described with reference to FIG. 1 in comparison with the present invention.

The center adjusting device 136 shown in FIG. 1 comprises a fixed member 119 fixed to a center rod 106 and a turnable member 111 rotatably mounted on the rod 106. The turnable member 111 holds a brake spring 109 and is integral with a projection 137 extending from one side of the member 111 and turnably supporting a nut 100. The fixed member 119 is integral with a bracket extending above the projection 137 and having an adjusting screw member 140 inserted therethrough. The screw member 140 is in screw-thread engagement with the nut 100 for adjusting the distance between the fixed member 119 and the turnable member 111. The screw member 140, when advanced or retracted relative to the nut 100, turns the turnable member 111 clockwise or counterclockwise about the center rod 106 for centering. At this time, the nut 100 turns while properly moving along the screw member 140. With this device, however, the nut 100 becomes unable to turn due to deposition of soil, sand or dust, failing to move properly along the screw member 140. If the screw member 140 is advanced or retracted in screw-threaded engagement with the nut 100 in this state, the screw thread will be collapsed.

According to the present invention, the forward end of the adjusting screw member 40 is merely in contact with the first projection 37, so that the screw member 40 is movable forward or backward independently of the turn of the turnable member 11 without entailing the likelihood that the thread will collapse. Moreover the spring member 42 provided in bearing contact with the second projection 38 renders the turnable member 11 smoothly rotatable clockwise or counterclockwise by the forward or rearward movement of the screw member 40.

In FIG. 1, the parts corresponding to like parts of the invention are referred to by the corresponding numerals plus 100 each.

What is claimed is:

1. A caliper brake apparatus of the side-pull type for a bicycle including a center rod fixed to the frame of the bicycle, a first arm and a second arm mounted on the center rod and pivotally movable to bring their forward ends toward or away from each other, a brake shoe attached to the forward end of each of the arms and movable into or out of contact with the rim of a wheel of the bicycle when the arms are moved toward or away from each other, a brake spring provided along the arms and biasing the arms away from each other, and a center adjusting device provided between the center rod and the brake spring, the center adjusting device comprising a fixed member fixedly mounted on the center rod and a turnable member rotatably mounted on the center rod, the turnable member holding the brake spring and having a pair of projections extending diametrically outwardly of the rod, the fixed member being provided with a screw member having a forward end in contact with one of the projections of the turnable member for adjusting the turned position of the turnable member, the fixed member being provided with a spring member in bearing contact with the other projection of the turnable member for biasing the turnable member to hold said one projection in contact with the forward end of the screw member at all times.

2. A brake apparatus as defined in claim 1 wherein the spring member is made of a steel wire or steel plate and bent into a loop portion having an outer periphery in bearing contact with said other projection of the turnable member.

3. A grake apparatus as defined in claim 2 wherein the fixed member has a portion projecting above the turnable member, and the spring member has a tail end fixed to the lower side of the projecting portion and a forward end extending from the loop portion and joined to the lower side of the tail end.

4. A brake apparatus as defined in any one of claims 1 to 3 wherein the center rod supports the brake apparatus and has a bolt portion extending from the rear end of the rod, the bolt portion being provided with a pair of seat members and a nut screwed on the rear end of the bolt portion, the bolt portion being inserted through the frame of the bicycle with the pair of seat members positioned in front and rear of the frame, the nut being tightened up to clamp the frame with the seat members and thereby fix the center rod to the frame, one of the seat members being integral with the fixed member serving as a component of the center adjusting device.

* * * * *